(12) United States Patent
Ryu et al.

(10) Patent No.: US 12,485,116 B2
(45) Date of Patent: Dec. 2, 2025

(54) PHARMACEUTICAL COMPOSITION FOR PREVENTING OR TREATING EPIDEMIC RNA VIRAL INFECTIOUS DISEASE

(71) Applicant: SHIN POONG PHARMACEUTICAL CO., LTD., Gyeonggi-do (KR)

(72) Inventors: Jei Man Ryu, Gyeonggi-do (KR); Chung Ju, Seoul (KR); Hyun Kyu Chung, Incheon (KR); Geum Sil Cho, Gyeonggi-do (KR)

(73) Assignee: SHIN POONG PHARMACEUTICAL CO., LTD., Gyeonggi-do (KR)

( * ) Notice: Subject to any disclaimer, the term of this patent is extended or adjusted under 35 U.S.C. 154(b) by 657 days.

(21) Appl. No.: 17/914,425

(22) PCT Filed: Mar. 25, 2021

(86) PCT No.: PCT/KR2021/003742
§ 371 (c)(1),
(2) Date: Sep. 26, 2022

(87) PCT Pub. No.: WO2021/194290
PCT Pub. Date: Sep. 30, 2021

(65) Prior Publication Data
US 2023/0132036 A1    Apr. 27, 2023

(30) Foreign Application Priority Data
Mar. 26, 2020   (KR) .................. 10-2020-0037135

(51) Int. Cl.
*A61K 31/4745*  (2006.01)
*A61K 31/366*   (2006.01)
*A61K 45/06*    (2006.01)
*A61P 31/14*    (2006.01)

(52) U.S. Cl.
CPC ........ *A61K 31/4745* (2013.01); *A61K 31/366* (2013.01); *A61K 45/06* (2013.01); *A61P 31/14* (2018.01)

(58) Field of Classification Search
CPC .... A61K 31/423; A61K 31/167; A61K 45/06; A61K 31/69; A61K 41/009; A61K 2300/00; C12Q 1/6827; C12Q 2600/106; C12Q 2600/156; C12Q 1/6886; A61P 35/00; A61P 35/04; A61P 37/02; A61P 37/08
See application file for complete search history.

(56) References Cited

U.S. PATENT DOCUMENTS

| | | | |
|---|---|---|---|
| 11,696,914 B1* | 7/2023 | Ekins | A61K 31/517 514/292 |
| 2007/0142459 A1 | 6/2007 | Schlegel et al. | |
| 2009/0156473 A1 | 6/2009 | Schubert | |
| 2014/0011829 A1 | 1/2014 | Steele et al. | |
| 2015/0196530 A1 | 7/2015 | Schlegel et al. | |
| 2016/0250181 A1 | 9/2016 | Rosen | |

FOREIGN PATENT DOCUMENTS

| | | |
|---|---|---|
| CN | 101857613 B | 4/2012 |
| CN | 101898966 B | 4/2013 |
| CN | 105168500 A | 12/2015 |
| CN | 115968285 A | 4/2023 |
| KR | 10-2006-0039286 A | 5/2006 |
| WO | WO-2021/186396 A2 | 9/2021 |

OTHER PUBLICATIONS

Ekins, et.al., Pharm Res (2020) 37:71, pp. 2-7, Tilorone: A Broad-Spectrum Antiviral Invented in the USA and Commercialized in Russia and beyond (Year: 2020).*
Guarner, American Journal of Clinical Pathology, vol. 153, Issue 4, Apr. 2020, pp. 420-421 (Year: 2020).*
Mbayame Ndiaye Niang, et.al., Journal of Medical Virology 82:866-872 (2010) (Year: 2010).*
International Search Report from corresponding PCT Application No. PCT/KR2021/003742, dated Jul. 21, 2021.
W. Peters & B. L. Robinson (1997) The chemotherapy of rodent malaria. LV. Interactions between pyronaridine and artemisinin, Annals of Tropical Medicine & Parasitology, 91:2, 141-145, DOI: 10.1080/00034983.1997.11813123.
Lane TR, Massey C, Comer JE, Anantpadma M, Freundlich JS, Davey RA, et al. (2019) Repurposing the antimalarial pyronaridine tetraphosphate to protect against Ebola virus infection. PLoS Negl Trop Dis 13(11): e0007890.
Krishna, S., et al., Trends in Parasitology, Jan. 2021, vol. 37, No. 1.
Pryce J, HineP. Pyronaridine-artesunate for treating uncomplicated *Plasmodium falciparum* malaria. *Cochrane Database of Systematic Reviews* 2019, Issue 1. Art. No. CD006404.
Bae, J. Y., et al.; "Pyronaridine and artesunate are potential antiviral drugs against COVID-19 and influenza", BioRxiv, 2020.
M. Waxman et al., The Lancet Infectious Diseases, 2017, vol. 17, No. 6, pp. 654-660.
G. Mori et al., Tuberculosis, 2018, vol. 112, pp. 98-109.
Shin Poong Pharm. Co. Ltd. "PYRAMAX", Jun. 28, 2019, Retrieved from the Internet.

(Continued)

*Primary Examiner* — Jeffrey S Lundgren
*Assistant Examiner* — Paul Randall Gauger
(74) *Attorney, Agent, or Firm* — Harness, Dickey & Pierce, P.L.C.

(57) ABSTRACT

The present invention relates to a use of pyronaridine or a pharmaceutically acceptable salt thereof, and/or artemisinin or a derivative thereof for preventing or treating an epidemic RNA viral infectious disease, and more specifically, to a pharmaceutical composition for preventing or treating an epidemic RNA viral infectious disease, in particular, Coronavirus Disease 2019 (COVID-19), the composition comprising a therapeutically effective amount of pyronaridine or a pharmaceutically acceptable salt thereof, and/or artemisinin or a derivative thereof, together with a pharmaceutically acceptable carrier.

15 Claims, 5 Drawing Sheets

(56) References Cited

OTHER PUBLICATIONS

Extended European Search Report from corresponding European Patent Application No. 21775231.0, dated Aug. 2, 2023.

Jeon, S., et al.; "Identification of antiviral drug candidates against SARS-CoV-2 from FDA-approved drugs", bioRxiv, Mar. 20, 2020,, 21 pages.

Efferth, T., et al.; "The Antiviral Activities of Artemisinin and Artesunate", Clinical Infectious Diseases 2008; 47:804-11.

Anantpadma, M., et al.; "Ebola Virus Bayesian Machine Learning Models Enable New in Vitro Leads", ACS Omega 2019, 4, 2353?2361.

D'Alessandro, S., et al.; "The Use of Antimalarial Drugs against Viral Infection", Microorganisms 2020, 8, 85, pp. 1-26.

\* cited by examiner

PHARMACEUTICAL COMPOSITION FOR PREVENTING OR TREATING EPIDEMIC RNA VIRAL INFECTIOUS DISEASE

CROSS-REFERENCE TO RELATED APPLICATIONS

This application is a national phase application of PCT Application No. PCT/KR2021/003742, filed on Mar. 25, 2021, which claims benefit to Korean Patent Application No. 10-2020-0037135, filed on Mar. 26, 2020. The entire disclosure of the applications identified in this paragraph are incorporated herein by reference.

TECHNICAL FIELD

The present invention relates to use of pyronaridine or a pharmaceutically acceptable salt thereof, and/or artemisinin or a derivative thereof for the prevention or treatment of epidemic RNA virus infections. More specifically, the present invention relates to a pharmaceutical composition for the prevention or treatment of epidemic RNA virus infections—specifically, coronavirus disease 2019 (COVID-19), which comprises a therapeutically effective amount of pyronaridine or a pharmaceutically acceptable salt thereof, and/or artemisinin or a derivative thereof, together with a pharmaceutically acceptable carrier.

BACKGROUND ART

RNA viruses having RNA genomes have a higher mutation rate than DNA viruses and easily generate mutants adapted to changes in the host and environment. Due to this property, it is difficult to control RNA viruses through antiviral agents or prophylactic vaccines. In addition, RNA viruses encode an RNA-dependent RNA polymerase (RdRp) that synthesizes RNA using RNA as a template in the viral genome, and RNA polymerases of host cells—which synthesize RNA using DNA as a template—cannot act on replication of RNA viruses. RNA viruses are divided into positive-sense single-stranded, negative-sense single-stranded and double-stranded dsRNA viruses according to the polarity of the genome and whether or not the genomic RNA is of an identical polarity to mRNA.

Acute viral infections—which have recently spread around the world and caused a global public health crisis—are rapidly spreading through transportation and trade from the country where virus is originated to other countries, and there is a great global demand for the development of therapeutic agents. In particular, epidemics by influenza H1 N1 flu in 2009, Ebola in West Africa in 2014 as well as in the Democratic Republic of the Congo in 2019, and Zika in 2016 are all RNA virus infections.

Coronaviruses are viruses belonging to a positive-stranded RNA virus family like Zika virus, have a positive-sense single-stranded RNA genome with a size of 25-32 kb, and are zoonotic viruses capable of infecting both human and animal cells, such as avian and mammalian cells. Coronaviruses have a structure in which characteristic club-shaped spike proteins protrude from their outer envelopes. Coronaviruses are a family of viruses with various members including SARS-CoV, MERS-CoV, or SARS-CoV-2 (2019-nCoV) which causes Severe Acute Respiratory Syndrome (SARS) emerged in 2003, Middle East Respiratory Syndrome (MERS) newly emerged in Saudi Arabia in 2012, or Coronavirus Disease 2019 (COVID-19, 2019-nCoV infection) recently declared as a public health emergency of international concern (PHEIC) by the World Health Organization (WHO), respectively.

SARS-CoV causes Severe Acute Respiratory Syndrome, which originated in China in 2002 and spread worldwide, recording a mortality rate of about 10% in 8,096 patients. It is usually accompanied by high fever and myalgia, and after 2-7 days, a dry cough without sputum appears, causing respiratory failure in 10-20% of patients. Since an appropriate treatment has not yet been established, antibacterial agents for atypical pneumonia may be administered, in combination with antiviral agents such as oseltamivir or ribavirin, or steroids.

MERS-CoV is assumed to be a virus transmitted from animal hosts such as camels to humans, causing severe acute respiratory syndrome and renal failure, causing around 2,000 infections in 26 countries including the Middle East, with a mortality rate of 35.6% (WHO, 2016). The incubation period is about 5 days, and it is accompanied by fever, cough, shortness of breath, and pneumonia. It was prevalent in a manner of limited transmission among family members or members within medical institutions, and commonly progressed to severe disease in people with underlying diseases such as diabetes.

SARS-CoV-2 (2019-nCoV) is a virus that causes COVID-19, and the first case was identified in Wuhan, China in 2019. After an incubation period of 1-14 days, various respiratory symptoms, ranging from mild to severe, such as cough, fever, malaise, shortness of breath, pneumonia, or acute respiratory distress syndrome, appear, and rarely sputum, sore throat and diarrhea appear. Because there is no selective antiviral agent for it, symptomatic management alone or in combination with treatment with antiviral agents previously indicated for other viral diseases is being used.

Specifically, COVID-19, the most recent outbreak among them, is spreading very quickly without any treatment or vaccine currently available (Li et al., 2020), and an appropriate cell or animal assay system for the disease has not yet been established. Currently, medications that have been reported to be clinically used or that are suggested in expert recommendations in China and Korea, includes chloroquine, remdesivir (Wang et al., 2020), lopinavir, favipiravir, ribavirin, interferon, etc., and more than 80 clinical trials are in progress (Maxmen et al., 2020). In particular, since SARS-CoV-2 belongs to the coronavirus family, reagents—previously known to have antiviral effects against MERS-CoV or SARS-CoV, which has approximately 79.5% homology in the nucleotide sequence to SARS-CoV-2—are attracting attention (Zhou et al., 2020), including reagents such as niclosamide (Xu et al., 2020).

In view of SARS or COVID-19 cases, when having close contact to a patient, the risk of infection is very high: viruses have a fairly high transmissibility to many people in a densely populated environment by aerosolized respiratory droplets. In addition, acute viral infections caused by these coronaviruses are rapidly spreading through transportation and trade from the country where virus is originated to other countries, thereby causing a global public health crisis.

Nevertheless, the development of an appropriate regimens for effectively inhibiting, treating or preventing such respiratory virus pathogens causing epidemics has been insufficient to date. As such, there is an urgent need to develop a drug for counteracting theses diseases for the health and welfare of human beings around the world.

In addition, although the clinical symptoms of their respiratory infections are somewhat similar and they belong to the same RNA virus family, there are differences according to genetic and structural levels among viruses, and it is reported that these differences affect the sensitivity and efficacy of antiviral drugs. Furthermore, these molecular-genetic differences in viruses cause differences in transmission routes, host receptors for virus binding, transmission rates, incubation periods and/or infection sites, leading to differences in clinical symptoms and therapeutic efficacy, and thus the development and application of appropriate reagent against the target virus are very important.

Also, given the rapid transmission, high mortality, and global health and economic risks caused by the respiratory infectious disease, in addition to the development of new drugs and vaccines that takes at least one to several years, it can be a very effective and cost-effective strategy to explore the possibility of preventing, improving or treating RNA virus infections, specifically coronavirus-induced respiratory diseases, based on drug repositioning of drugs whose safety has been guaranteed by previous clinical trials and practical use experience.

DISCLOSURE OF INVENTION

Technical Problem

An object of the present invention is to provide use of pyronaridine or a pharmaceutically acceptable salt thereof, and/or artemisinin or a derivative thereof in the prevention or treatment of epidemic RNA virus infections.

Another object of the present invention is to provide a pharmaceutical composition for the prevention or treatment of epidemic RNA virus infections comprising a therapeutically effective amount of pyronaridine or a pharmaceutically acceptable salt thereof, and/or artemisinin or a derivative thereof, together with a pharmaceutically acceptable carrier.

Still another object of the present invention is to provide a method for the prevention or treatment of epidemic RNA virus infections by using pyronaridine or a pharmaceutically acceptable salt thereof, and/or artemisinin or a derivative thereof.

Solution to Problem

In order to achieve the above object, the present invention provides a pharmaceutical composition for the prevention or treatment of epidemic RNA virus infections comprising a therapeutically effective amount of pyronaridine or a pharmaceutically acceptable salt thereof, and/or artemisinin or a derivative thereof, together with a pharmaceutically acceptable carrier.

In addition, the present invention provides use of pyronaridine or a pharmaceutically acceptable salt thereof, and/or artemisinin or a derivative thereof in the prevention or treatment of epidemic RNA virus infections.

Furthermore, the present invention provides a method for the prevention or treatment of epidemic RNA virus infections which comprises administering a therapeutically effective amount of pyronaridine or a pharmaceutically acceptable salt thereof, and/or artemisinin or a derivative thereof to a subject in need thereof.

The present invention is described in detail hereinafter.

According to one aspect of the present invention, there is provided a pharmaceutical composition for the prevention or treatment of epidemic RNA virus infections comprising a therapeutically effective amount of pyronaridine of the following Formula 1 or a pharmaceutically acceptable salt thereof, together with a pharmaceutically acceptable carrier:

[Formula 1]

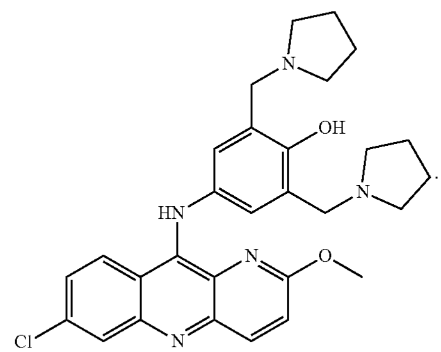

According to another aspect of the present invention, there is provided a pharmaceutical composition for the prevention or treatment of epidemic RNA virus infections comprising a therapeutically effective amount of artemisinin of the following Formula 2 or a derivative thereof, together with a pharmaceutically acceptable carrier:

[Formula 2]

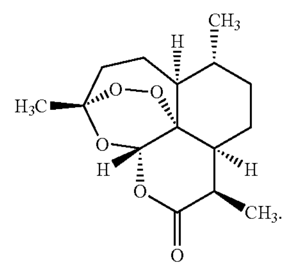

According to another aspect of the present invention, there is provided a pharmaceutical composition for the prevention or treatment of epidemic RNA virus infections comprising a therapeutically effective amount of pyronaridine of the above Formula 1 or a pharmaceutically acceptable salt thereof, and artemisinin of the above Formula 2 or a derivative thereof, together with a pharmaceutically acceptable carrier.

In one embodiment according to the present invention, examples of the pharmaceutically acceptable salt of pyronaridine may include an acid-addition salt which is formed from phosphoric acid, sulfuric acid, hydrochloric acid, acetic acid, methanesulfonic acid, benzenesulfonic acid, toluenesulfonic acid, maleic acid or fumaric acid, but are not limited thereto. In another embodiment according to the present invention, the pharmaceutically acceptable salt of pyronaridine may be pyronaridine tetraphosphate.

In another embodiment according to the present invention, examples of the artemisinin derivative may include dihydroartemisinin, artesunate, artemether and arteether, but are not limited thereto. In another embodiment according to the present invention, the artemisinin derivative may be artesunate.

According to another embodiment of the present invention, in the pharmaceutical composition comprising a therapeutically effective amount of pyronaridine or a pharmaceutically acceptable salt thereof, and artemisinin or a derivative thereof, together with a pharmaceutically acceptable carrier, a weight ratio of the pyronaridine or a pharmaceutically acceptable salt thereof to the artemisinin or a derivative thereof may be 10:1 to 1:10. In another embodiment according to the present invention, the weight ratio of the pyronaridine or a pharmaceutically acceptable salt thereof to the artemisinin or a derivative thereof may be 1:1 to 6:1. In another embodiment according to the present invention, the weight ratio of the pyronaridine or a pharmaceutically acceptable salt thereof to the artemisinin or a derivative thereof may be 1:1 to 4:1. In another embodiment according to the present invention, the weight ratio of the pyronaridine or a pharmaceutically acceptable salt thereof to the artemisinin or a derivative thereof may be 3:1.

As used herein, the term "pharmaceutically acceptable" refers to intoxicity that is physiologically acceptable and does not inhibit the action of an active ingredient when administered to humans, and does not usually cause gastrointestinal disorders, allergic reactions such as dizziness or similar reactions. The pharmaceutical composition of the present invention may be formulated in various ways according to the route of administration by methods known in the art together with a pharmaceutically acceptable carrier. The route of administration is not limited thereto, but may be administered orally or parenterally. Parenteral routes of administration include, for example, various routes such as transdermal, nasal, intraperitoneal, intramuscular, subcutaneous, intravenous and the like.

When the pharmaceutical composition of the present invention is orally administered, the pharmaceutical composition of the present invention may be formulated in the form of powder, granule, tablet, pill, dragee, capsule, liquid, gel, syrup, suspension, wafer, injection, suppository and the like according to a method known in the art together with a suitable oral administration carrier. Examples of suitable carriers may include sugars including lactose, glucose, sucrose, sorbitol, mannitol, xylitol, erythritol and maltitol; starches including corn starch, wheat starch, rice starch and potato starch; celluloses including cellulose, methylcellulose, sodium carboxymethyl cellulose, hydroxypropyl methylcellulose and low-substituted hydroxymethyl cellulose; and fillers such as gelatin and polyvinylpyrrolidone. In addition, if necessary, crospovidone, sodium starch glycolate, croscarmellose sodium, sodium carboxymethyl cellulose, agar, alginic acid or sodium alginate may be added as a disintegrant. Furthermore, the pharmaceutical composition may additionally include a glidant, an anti-aggregating agent, a plasticizer, a lubricant, a wetting agent, a flavoring agent, an emulsifier, a preservative and the like.

Also, when administered parenterally, the pharmaceutical composition of the present invention may be formulated in the form of injection, suppository, transdermal administration and nasal inhalant according to methods known in the art together with a suitable parenteral carrier. In the case of the injection, it must be sterilized and protected from contamination of microorganisms such as bacteria and fungi. Examples of suitable carriers for injection include, but are not limited to, a solvent or dispersion medium containing water, ethanol, polyols (e.g., glycerol, propylene glycol, and liquid polyethylene glycol, and the like), a mixture thereof and/or vegetable oil. More preferably, suitable carriers include Hanks' solution, Ringer's solution, phosphate buffered saline (PBS) or sterile water for injection containing triethanolamine, 10% ethanol, 40% propylene glycol, and isotonic solutions such as 5% glucose. In order to protecting the injection from microbial contamination, it may further comprise various antibacterial and antifungal agents such as parabens, chlorobutanol, phenol, sorbic acid, thimerosal and the like. In addition, in most cases, the injection may further comprise an isotonic agent such as sugar or sodium chloride.

These formulations are described in the document (Remington's Pharmaceutical Science, 15th Edition, 1975, Mack Publishing Company, Easton, Pennsylvania) commonly known prescription in pharmaceutical chemistry.

In the case of administration by inhalation, the compound for use according to the present invention may be conveniently delivered in the form of an aerosol spray from a pressurized pack or a nebulizer by using a suitable propellant—for example, dichlorofluoromethane, trichlorofluoromethane, dichlorotetrafluoroethane, carbon dioxide or other suitable gas. In the case of a pressurized aerosol, the dosage unit may be determined by providing a valve to deliver a metered amount. For example, capsules and cartridges for use in inhalers or insufflators may be formulated to contain a powder mixture based on a suitable powder base.

As other pharmaceutically acceptable carriers, reference may be made to those described in the following document (Remington's Pharmaceutical Sciences, $19^{th}$ Edition, 1995 Mack Publishing Company, Easton, Pennsylvania).

In another embodiment of the present invention, pyronaridine or a pharmaceutically acceptable salt thereof was formulated together with pharmaceutically acceptable carriers.

As described above, the "pharmaceutically acceptable carrier" that can be used in the present invention may be any one conventionally used in the pharmaceutical field. Representative examples may include lactose, dextrin, starch, pregelatinized starch, microcrystalline cellulose, hydroxypropyl methylcellulose, hydroxypropyl cellulose, low-substituted hydroxypropyl cellulose, hydroxyethyl cellulose, ethyl cellulose, methyl cellulose, polyethylene glycol, silicon dioxide, hydrotalcite, aluminum magnesium silicate, aluminum hydroxide, aluminum silicate, magnesium aluminometasilicate, bentonite and a mixture thereof. In addition to the carrier, the pharmaceutical composition of the present invention may further comprise a disintegrant for rapid disintegration and dissolution in contact with an aqueous medium when administered in vivo, a solubilizer or surfactant to increase dissolution or absorption, and a glidant or lubricant to increase fluidity or lubrication. Examples of the disintegrant may include crospovidone, sodium starch glycolate, croscarmellose sodium, sodium carboxymethylcellulose, agar, alginic acid or sodium alginate. Examples of the glidant or lubricant may include colloidal silicon dioxide, silicon dioxide, talc, magnesium stearate, calcium stearate, zinc stearate, sodium stearate fumarate, stearic acid or silicon dioxide. However, it is not limited to the recited examples. According to another embodiment of the present invention, there is provided a pharmaceutical composition comprising 40 to 80% by weight of pyronaridine or a pharmaceutically acceptable salt thereof, 1 to 30% by weight of microcrystalline cellulose, 0.1 to 5% by weight of silicon dioxide, 1 to 10% by weight of hydroxypropyl cellulose, 1 to 10% by weight of low-substituted hydroxypropyl cellulose, 2 to 20% by weight of sodium starch glycolate and 1 to 10% by weight of magnesium stearate.

In another embodiment of the present invention, artemisinin or a derivative thereof was formulated together with pharmaceutically acceptable carriers. In addition to the carrier, the pharmaceutical composition of the present invention may further comprise a disintegrant for rapid disintegration and dissolution in contact with an aqueous medium when administered in vivo, a solubilizer or surfactant to increase dissolution or absorption, and a glidant or lubricant to increase fluidity or lubrication. Examples of the carrier may include microcrystalline cellulose, lactose hydrate, mannitol, starch, pregelatinized starch, low-substituted hydroxycellulose, hydroxycellulose, hydroxypropylcellulose, low-substituted hydroxypropylcellulose or hydroxypropyl methylcellulose. Examples of the disintegrant may include crospovidone, sodium starch glycolate, croscarmellose sodium, sodium carboxymethyl cellulose, agar, alginic acid or sodium alginate. Examples of the glidant or lubricant may include colloidal silicon dioxide, silicon dioxide, talc, magnesium stearate, calcium stearate, zinc stearate, sodium stearyl fumarate, stearic acid or silicon dioxide. Representative examples of the surfactant may include sodium lauryl sulfate and a derivative thereof, poloxamer and a derivative thereof, saturated polyglycolized glyceride (aka gelucire), labrasol, various of polysorbate (for example, polyoxyethylene sorbitan monolaurate (hereinafter, Tween 20), polyoxyethylene sorbitan monopalmitate (hereinafter, Tween 40), polyoxyethylene sorbitan monostearate (hereinafter, Tween 60), polyoxyethylene sorbitan monooleate (hereinafter, Tween 80)), sorbitan esters (for example, sorbitan monolaurate (hereinafter, Span 20), sorbitan monopalmitate (hereinafter, Span 40), sorbitan monostearate (hereinafter, Span 60), sorbitan monooleate (hereinafter, Span 80), sorbitan trilaurate (hereinafter, Span 25), sorbitan trioleate (hereinafter, Span 85), sorbitan tristearate (hereinafter, Span 65)), cremophor, PEG-60 hydrogenated castor oil, PEG-40 hydrogenated castor oil, sodium lauryl glutamate or disodium cocoamphodiacetate. However, it is not limited to the recited examples. According to another embodiment of the present invention, there is provided a pharmaceutical composition comprising 10 to 50% by weight of artemisinin or a derivative thereof, 30 to 70% by weight of microcrystalline cellulose, 2 to 20% by weight of low-substituted hydroxypropyl cellulose, 2 to 20% by weight of sodium starch glycolate, 0.1 to 5% by weight of silicon dioxide, 0.5 to 15% by weight of sodium lauryl sulfate and 0.1 to 5% by weight of magnesium stearate.

In another embodiment of the present invention, pyronaridine or a pharmaceutically acceptable salt thereof and artemisinin or a derivative thereof were formulated together with pharmaceutically acceptable carriers. In addition to the carrier, the pharmaceutical composition of the present invention may further comprise a disintegrant for rapid disintegration and dissolution in contact with an aqueous medium when administered in vivo, a solubilizer or surfactant to increase dissolution or absorption, and a glidant or lubricant to increase fluidity or lubrication. Examples of the carrier may include lactose, dextrin, starch, pregelatinized starch, microcrystalline cellulose, hydroxypropyl methylcellulose, hydroxypropyl cellulose, low-substituted hydroxypropyl cellulose, hydroxyethyl cellulose, ethyl cellulose, methyl cellulose, polyethylene glycol, silicon dioxide, hydrotalcite, aluminum magnesium silicate, aluminum hydroxide, aluminum silicate, magnesium aluminum metasilicate, bentonite, butylhydroxytoluene and a mixture thereof. Representative examples of the surfactant may include sodium lauryl sulfate and a derivative thereof, poloxamer and a derivative thereof, saturated polyglycolized glyceride (aka gelucire), labrasol, various of polysorbate (for example, polyoxyethylene sorbitan monolaurate (hereinafter, Tween 20), polyoxyethylene sorbitan monopalmitate (hereinafter, Tween 40), polyoxyethylene sorbitan monostearate (hereinafter, Tween 60), polyoxyethylene sorbitan monooleate (hereinafter, Tween 80)), sorbitan esters (for example, sorbitan monolaurate (hereinafter, Span 20), sorbitan monopalmitate (hereinafter, Span 40), sorbitan monostearate (hereinafter, Span 60), sorbitan monooleate (hereinafter, Span 80), sorbitan trilaurate (hereinafter, Span 25), sorbitan trioleate (hereinafter, Span 85), sorbitan tristearate (hereinafter, Span 65)), cremophor, PEG-60 hydrogenated castor oil, PEG-40 hydrogenated castor oil), sodium lauryl glutamate or disodium cocoamphodiacetate, but are not limited thereto. Examples of the disintegrant may include crospovidone, sodium starch glycolate, croscarmellose sodium, sodium carboxymethylcellulose, agar, alginic acid or sodium alginate. Examples of the glidant or lubricant may include colloidal silicon dioxide, silicon dioxide, talc, magnesium stearate, calcium stearate, zinc stearate, sodium stearate fumarate, stearic acid or silicon dioxide. However, it is not limited to the recited examples. According to another embodiment of the present invention, there is provided a pharmaceutical composition comprising 15 to 60% by weight of pyronaridine or a pharmaceutically acceptable salt thereof, 5 to 20% by weight of artemisinin or a derivative thereof, 5 to 30% by weight of microcrystalline cellulose, 10 to 40% by weight of crospovidone, 2 to 15% by weight of low-substituted hydroxypropyl cellulose, 1 to 10% by weight of sodium lauryl sulfate, 5 to 30% by weight of polyethylene glycol, 0.1 to 5% by weight of hydroxypropyl cellulose, 0.001 to 1% by weight of butylhydroxytoluene, 0.1 to 5% by weight of silicon dioxide and 0.5 to 10% by weight of magnesium stearate.

The pharmaceutical composition of the present invention may be formulated in powder, granule, tablet, capsule, dry syrup, coating preparation, injection, suppository, transdermal administration, inhalation administration and the like.

In another embodiment of the present invention, the pharmaceutical composition of the present invention may be administered in combination with one or more additional drugs having antiviral efficacy to prevent and treat epidemic RNA virus infections.

In another embodiment of the present invention, examples of the other antiviral agents may include viral replication inhibitors, helicase inhibitors, viral protease inhibitors and viral cell entry inhibitors, but are not limited thereto. In another embodiment of the present invention, the other antiviral agent may be, for example, ribavirin, interferon, niclosamide or a combination thereof, but is not limited thereto.

In another embodiment of the present invention, examples of the epidemic RNA virus infectious disease may include, but are not limited to, Zika virus infection, Ebola virus infection, and respiratory diseases caused by novel influenza virus and coronavirus infections. In another embodiment of the present invention, examples of the respiratory diseases caused by the coronavirus infections may include, but are not limited to, Severe Acute Respiratory Syndrome (SARS), Middle East Respiratory Syndrome (MERS) or Coronavirus Disease 2019 (COVID-19). In another embodiment of the present invention, the respiratory disease caused by the coronavirus infection may be Coronavirus Disease 2019 (COVID-19).

In the present invention, the term "prevention" refers to any action that inhibits or delays the occurrence, spread and recurrence of epidemic RNA virus infections by administering the pharmaceutical composition of the present invention, and the term "treatment" refers to any action in which the symptoms of the disease are improved or beneficially changed by administering the pharmaceutical composition of the present invention.

In addition, as used herein, the term "therapeutically effective amount" refers to an amount that exhibits a higher response than a negative control, and preferably refers to an amount sufficient to prevent or treat epidemic RNA virus infections. The therapeutic dose for a patient is generally 50 to 2,000 mg/day, and more preferably 100 to 1,000 mg/day, depending on the severity of the condition and whether administered alone or in combination, or in combination with other drugs. It may be administered once a day or in divided doses via the oral or parenteral route. However, the therapeutically effective amount may be appropriately changed depending on various factors such as the type and severity of disease, the age, body weight, health status and gender of a patient, administration route, and treatment period.

Although the present invention describes the prevention and treatment of epidemic RNA virus infections in humans, preferably respiratory diseases caused by coronavirus infections in humans, and more preferably COVID-19 in humans, the present invention may be useful for the treatment of infectious RNA viruses, specifically viruses in Coronaviridae causing respiratory diseases, and more specifically the virus causing COVID-19, in animals and humans.

The problems of the present invention are not limited to the technical problems mentioned above, and other technical problems not mentioned would be clearly understood by a person skilled in the art from the following description. In addition, the above description does not limit the claimed invention in any manner, furthermore, the combination of discussed features is not absolutely necessary for the inventive solution.

Advantageous Effects of Invention

The present invention provides a pharmaceutical composition for the prevention or treatment of epidemic RNA virus infections comprising a therapeutically effective amount of pyronaridine or a pharmaceutically acceptable salt thereof, and/or artemisinin or a derivative thereof as active ingredient(s). The pharmaceutical composition according to the present invention can be effectively used for the prevention or treatment by effectively inhibiting epidemic RNA virus infections—for example, respiratory diseases such as COVID-19 caused by coronaviruses.

MODE FOR THE INVENTION

Figure 1:
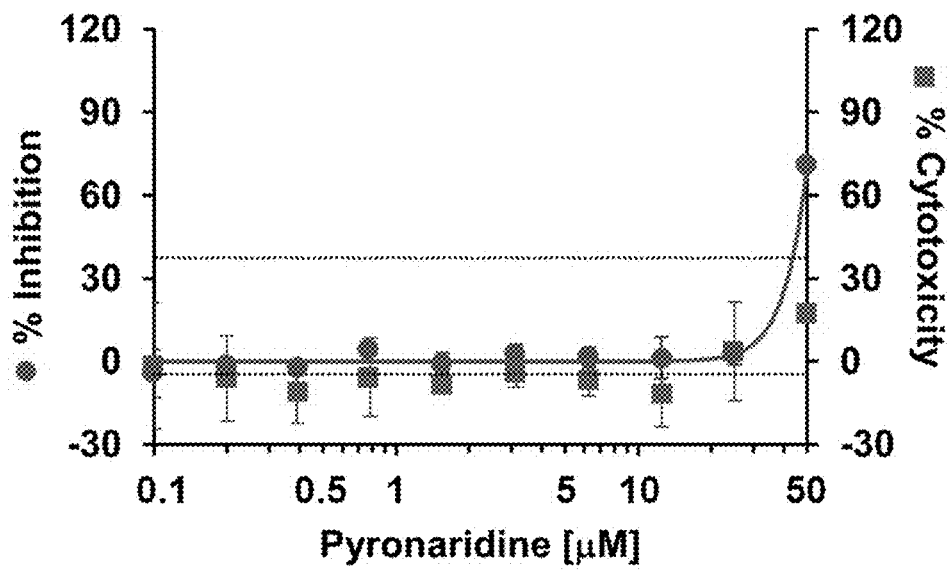
FIG. 1 is a concentration-response curve regarding the inhibitory effects against SARS-CoV-2 and cytotoxicity by the pretreatment with pyronaridine tetraphosphate—which is one of the active ingredients of the present invention—when measured at 24 hours post-infection.

Hereinafter, the constitutions and effects of the present invention will be described in more detail through examples. However, these examples are only illustrative, and the scope of the present invention is not limited thereto.

Example 1: Preparation of Pyronaridine Tetraphosphate Monotablet

Hydroxypropyl cellulose was dissolved in ethanol to prepare a binding solution. After wet granulation of pyronaridine tetraphosphate using the prepared binding solution, the obtained product was dried and granulated. Low-substituted hydroxypropyl cellulose, sodium starch glycolate, microcrystalline cellulose and silicon dioxide were mixed. After lubrication by adding magnesium stearate, tablets were prepared by tableting.

TABLE 1

| Ingredient content (mg/preparation) | |
|---|---|
| Pyronaridine tetraphosphate | 360 |
| Microcrystalline cellulose | 48 |
| Silicon dioxide | 6 |
| Hydroxypropyl cellulose | 12 |
| Low-substituted hydroxypropyl cellulose | 18 |
| Sodium starch glycolate | 24 |
| Magnesium stearate | 12 |

Example 2: Preparation of Artesunate Monotablet

Silicon dioxide and sodium lauryl sulfate were sieved using a sieve. The sieved silicon dioxide and sodium lauryl sulfate were mixed with artesunate, microcrystalline cellulose, low-substituted hydroxypropyl cellulose and sodium starch glycolate, lubricated by adding magnesium stearate, and then tableted to prepare tablets. The obtained product was coated with a film-coating agent.

TABLE 2

| Ingredient content (mg/preparation) | |
|---|---|
| Artesunate | 100 |
| Microcrystalline cellulose | 228 |
| Low-substituted hydroxypropyl | 30 |
| cellulose Sodium starch glycolate | 20 |
| Silicon dioxide | 5 |

TABLE 2-continued

| Ingredient content (mg/preparation) | |
| --- | --- |
| Sodium lauryl sulfate | 12 |
| Magnesium stearate | 5 |
| Film-coating agent (Opadry) | 12 |

Example 3: Preparation of Pyronaridine Tetraphosphate/Artesunate Combination Tablet Polyethylene glycol as a melting dispersing carrier, butylhydroxytoluene and artesunate as an active ingredient were mixed, melted by heating, and then rapidly cooled and finely pulverized. Then, microcrystalline cellulose, low-substituted hydroxypropyl cellulose, crospovidone and magnesium stearate were mixed thereto to obtain Mixture 1. After dissolving hydroxypropyl cellulose in ethanol, pyronaridine tetraphosphate was wet-granulated, dried and granulated to obtain Mixture 2. Mixture 1, Mixture 2, sodium lauryl sulfate, silicon dioxide and crospovidone were mixed, and then magnesium stearate was added thereto to lubricate the mixture, followed by tableting to prepare tablets. The obtained product was coated with a film-coating agent.

TABLE 3

| Ingredient content (mg/preparation) | |
| --- | --- |
| Artesunate | 60 |
| Pyronaridine tetraphosphate | 180 |
| Microcrystalline cellulose | 93 |
| Crospovidone | 120 |
| Low-substituted hydroxypropyl cellulose | 38 |
| Sodium lauryl sulfate | 23 |
| Polyethylene glycol | 90 |
| Hydroxypropyl cellulose | 6 |
| Butylhydroxytoluene | 0.12 |
| Silicon dioxide | 4.5 |
| Magnesium stearate | 16.5 |
| Film-coating agent (Opadry) | 20 |

In order to determine whether pyronaridine or a salt thereof, and artemisinin or a derivative thereof of the present invention have antiviral activity against coronavirus, the reagents were treated alone and in combination as in the following Experimental Examples, and the inhibitory rates against viral infection were evaluated.

Experimental Example 1: Evaluation of Antiviral Effects of Pyronaridine Tetraphosphate (Pretreatment)

In Experimental Example 1, before infecting cells with SARS-CoV-2 (a Korean isolate), pyronaridine tetraphosphate was pretreated for 1 hour, and the inhibitory efficacy against virus infection was evaluated.

1) Preparation of Viruses and Host Cells

Vero cells were purchased from the American Type Culture Collection (ATCC) and incubated at 37° C. with 5% $CO_2$ in Dulbecco's Modified Eagle's Medium (DMEM), supplemented with 10% heat-inactivated fetal bovine serum (FBS) and an antibiotic. SARS-CoV-2 was provided by the Korea Centers for Disease Control and Prevention (KCDC). After virus amplification, the viral titers were determined by a plaque assay by counting viral plaques formed in the cells used for virus amplification upon infection with the virus.

2) Determination of Antiviral Efficacy Using Immunofluorescence Staining Imagings Vero cells were seeded at $1.2 \times 10^4$ cells per well in µClear plates, and 24 hours prior to the experiment cells were pre-treated for 1 hour with a series of 10 dilutions of drugs in culture media in the range of 0.05-50 µM, and then SARS-CoV-2 was inoculated to the cells at a multiplicity of infection (MOI) of 0.0125. Twenty-four hours after infection, the cells were fixed with 4% formaldehyde, and the infected cells were analyzed by immunofluorescence staining using an antibody against N protein of SARS-CoV-2. The infection rate was calculated as the ratio of the number of infected cells to the total number of cells compared to the positive and negative controls through the imaging analysis program. The antiviral effect of the drug is represented as a concentration-response curve, and using the Graph Prism (Ver. 8) analysis program, 50% effective concentration ($EC_{50}$, concentration that inhibits virus infection-induced cytotoxicity by 50%) and 50% cytotoxic concentration ($CC_{50}$, the concentration of the compound that causes damage in 50% of cells in comparison with normal cells) was calculated as shown in Equation 1.

$$\text{Sigmoidal model}, Y = \text{Bottom} + (\text{Top} - \text{Bottom})/(1 + (IC_{50}/X)^{Hillslope}) \qquad \text{<Equation 1>}$$

As a result, as shown in FIG. 1, in the case of Vero cells infected with SARS-CoV-2, 70% virus inhibition rate was observed at a concentration of 50 µM of pyronaridine, but cytotoxicity was also increased by 17% by drug pretreatment. The Vero cells were isolated from the kidney epithelial cells of African green monkeys (*Chlorocebus* sp.) and have been known as type-1 IFN-deficient cells. In the previous study, when measuring the in vitro antiviral efficacy of pyronaridine against Ebola virus in Vero cells, no antiviral activity was observed at a concentration below $CC_{50}$ ($CC_{50}$=1.3 µM), but when inoculated into human-derived Hela cells, it was reported that the $CC_{50}$ is higher and the antiviral activity showed at a non-toxic concentration ($EC_{50}$=0.42-1.12 µM, $CC_{50}$=3.1 µM). In addition, pyronaridine significantly inhibited mortality and viral infection rate in mouse models challenged with Ebola virus (Lane et al., 2015). It is well known that the efficacy of antiviral agents may differ in in vitro or in vivo assay systems depending on the differences in characteristics of the host cells tested and their intracellular immune signaling pathways (Lane et al., 2015), and thus human-derived host cell-based assays were additionally established, and the antiviral efficacy of pyronaridine was further confirmed in various cell lines and animal studies.

Experimental Example 2: Inhibitory Effects of Pyronaridine Tetraphosphate Against SARS-CoV-2 Virus (Co-Treatment)

In Experimental Example 2, the inhibitory effects of pyronaridine against viral infection were evaluated when co-treated cells at the time of SARS-CoV-2 (a Korean isolate) infection. Chloroquine is known to exhibit antiviral efficacy by increasing endosomal pH leading to inhibition of viral binding to the cells and glycosylation of host receptors to SARS-CoV (Vincent et al., 2005). Since pyronaridine—which has a structure similar to chloroquine—was also expected to act via a similar mechanism, pyronaridine was simultaneously treated at the time of viral infection and its antiviral efficacy was measured. By optimizing some experimental conditions used in Experimental Example 1, the experiment was carried out under test conditions with relatively low cytotoxicity.

1) Preparation of Viruses and Host Cells

Vero cells were incubated at 37° C. with 5% $CO_2$ in Dulbecco's Modified Eagle's Medium (DMEM), supplemented with 10% heat-inactivated fetal bovine serum (FBS) and an antibiotic. SARS-CoV-2 was provided by the Korea Centers for Disease Control and Prevention (KCDC). After viral amplification, the viral titers were determined through qRT-PCR measuring RNA copy numbers.

2) Measurement of Antiviral Efficacy Using RNA Copy Numbers

After dissolving pyronaridine tetraphosphate in DMSO, it was diluted to a concentration of 0.033-100 µM using culture media. Twenty-four hours before the experiment, SARS-CoV-2 was inoculated into Vero cells seeded in a 96-well plate at a density of $2 \times 10^4$ cells/well (MOI=0.01), and the culture media containing various dilutions of drug were added to each well. Twenty-four hours after infection, the cell supernatant was collected, RNA was extracted, and qRT-PCR was performed against the RdRp gene. The antiviral efficacy of the drug was analyzed by comparing the copy number of viral RNA with the drug with that with the control. A drug concentration-response curve was drawn with the viral infection inhibition rate (% inhibition) from the virus titer inversely calculated from the RNA copy number, and 50% effective concentration ($EC_{50}$, the concentration that inhibits virus titer by 50%) was calculated using the Graph Prism (Ver. 8) analysis program, as in Experimental Example 1.

3) Measurement of Cytotoxicity (% Cytotoxicity)

Cytotoxicity was measured using a tetrazolium salts-based assay (WST-1). WST-1 is converted into a chromogenic substance called formazan by mitochondrial dehydrogenases, which are present only in living cells. After adding 10 µL of WST-1 premix to each well, cells were incubated for 1 additional hour, and the amount of formazan produced was calculated with its absorbance measured by ELISA. The 50% cytotoxic concentration ($CC_{50}$, the concentration of compound that causes damage in 50% of cells compared with normal cells) was calculated.

Figure 2:
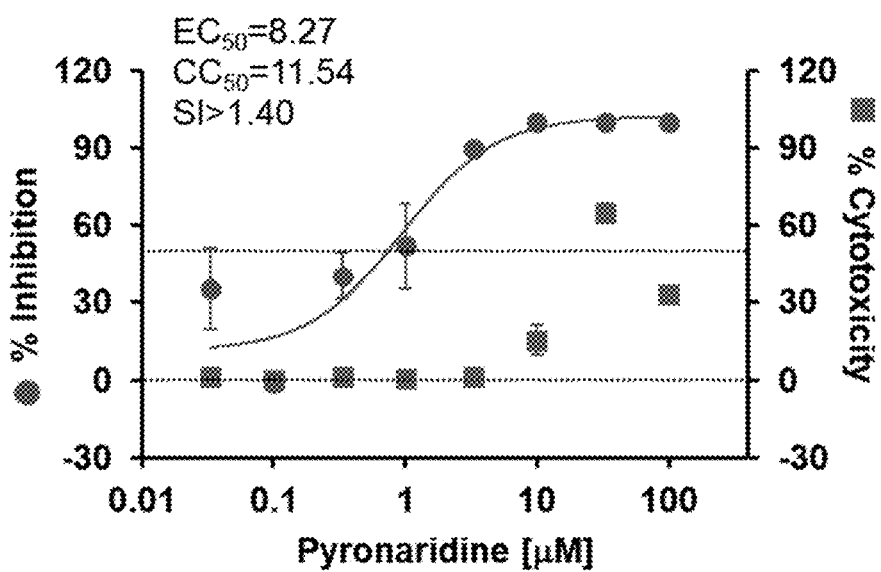
FIG. 2 is a concentration-response curve regarding the inhibitory effects against SARS-CoV-2 and cytotoxicity by the co-treatment with pyronaridine tetraphosphate when measured at 24 hours post-infection.

As a result, as shown in FIG. 2, pyronaridine exhibited the antiviral effect in a concentration-dependent manner when co-treated, and cytotoxicity was observed at some high concentrations, but antiviral activity against SARS-CoV-2 virus, more than 90% inhibition, at non-cytotoxic concentrations ($EC_{50}$=8.27 µM, $CC_{50}$=11.54 µM; selectivity index, SI>1.40).

Experimental Example 3: Inhibitory Effects of Artesunate Against SARS-CoV-2 (Co-Treatment)

In Experimental Example 3, the antiviral efficacy of artesunate was measured under the same experimental conditions as in Experimental Example 2.

1) Preparation of Virus and Host Cell

Vero cells and viruses were prepared in the same manner as shown in Experimental Example 2.

2) Measurement of Antiviral Efficacy Using RNA Copy Numbers

Artesunate was dissolved in DMSO and then diluted to concentrations of 3.13, 12.5, and 50 µM using media. Twenty-four hours before the experiment, SARS-CoV-2 was inoculated into Vero cells seeded in a 96-well plate at a density of $2 \times 10^4$ cells/well (MOI=0.01), and the culture media containing various dilutions of drug were added to each well. At 24 hours and 48 hours after infection, the cell supernatant was collected, and qRT-PCR was performed against the RdRp gene to calculate the virus titer and to calculate the virus infection inhibition rate (% inhibition) as shown in Experimental Example 2. As the control, chloroquine was used.

3) Measurement of Cytotoxicity (% Cytotoxicity)

Cytotoxicity was measured in the same manner as shown in Experimental Example 2.

Figure 3:
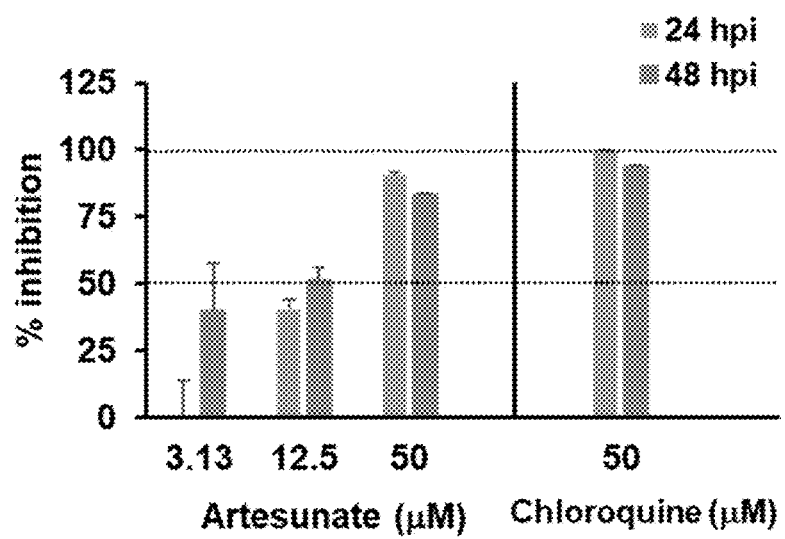
FIG. 3 shows the results in which the inhibitory effects against SARS-CoV-2 by co-treatment of artesunate—one of the active ingredients of the present invention—were measured at 24 hours and 48 hours post-infection and compared with those by chloroquine as a control.

As a result, as shown in FIG. 3, artesunate exhibited the antiviral activity in a concentration-dependent manner and showed 83% inhibition rate against virus at a concentration of 50 µM. At 12.5 µM, the inhibition rates were 40% and 51% at 24 hours post-infection (24 hpi) and 48 hours post-infection (48 hpi), respectively. In addition, at 3.13 µM, the inhibition rate was 39% at 48 hours post-infection. There was no significant cytotoxicity in all conditions tested. Artesunate had a lower $EC_{50}$ and slower onset time for SARS-CoV-2 inhibition compared to pyronaridine or chloroquine used as the control, but had a long-lasting antiviral effect, showing a pattern in which the virus inhibition rate increased slowly over time.

Experimental Example 4: Inhibitory Effects of Pyronaridine Tetraphosphate/Artesunate Combination Against SARS-CoV-2

Unlike chloroquine, which did not show antiviral effect in the guinea pig models infected with Ebola virus, pyronaridine significantly improved the virus titer and survival rate in Ebola virus-challenged mouse models. As such, it was assumed that chloroquine may have different mechanisms of action in addition, among which immunomodulatory mechanisms such as type 1 IFN-1 pathway were suggested (Lane et al., 2019). Artesunate also showed an antiviral efficacy against Ebola virus in in vitro assays but weaker than pyronaridine (Gignox et al., 2016). Therefore, in Experimental Example 4, the changes in antiviral efficacy according to treatment in combination at different combination ratio of the two drugs were evaluated.

1) Preparation of Virus and Host Cells

Vero cells and virus were prepared in the same manner as shown in Experimental Example 2.

2) Measurement of Antiviral Efficacy Using RNA Copy Numbers

Pyronaridine tetraphosphate and artesunate were dissolved in DMSO, diluted to various concentrations using media at various combination ratios such as 1:1, 3:1, 10:1, etc. Twenty-four hours before the experiments, SARS-CoV-2 was inoculated into Vero cells seeded in a 96-well plate at a density of $2 \times 10^4$ cells/well (MOI=0.01), and the culture media containing various dilutions of drug were added to each well. At 24 hours after infection, the cell supernatant was collected, and qRT-PCR was performed against the RdRp gene to calculate the virus titer and the virus infection inhibition rate (% inhibition) as shown in Experimental Example 2. When 10 µM of pyronaridine tetraphosphate and 3.3 µM of artesunate were treated in combination, virus titers were measured at 24 and 48 hours after infection each, and compared with chloroquine and lopinavir used as the controls.

3) Measurement of Cytotoxicity (% Cytotoxicity)

Cytotoxicity was measured in the same manner as shown in Experimental Example 2.

Figure 4:
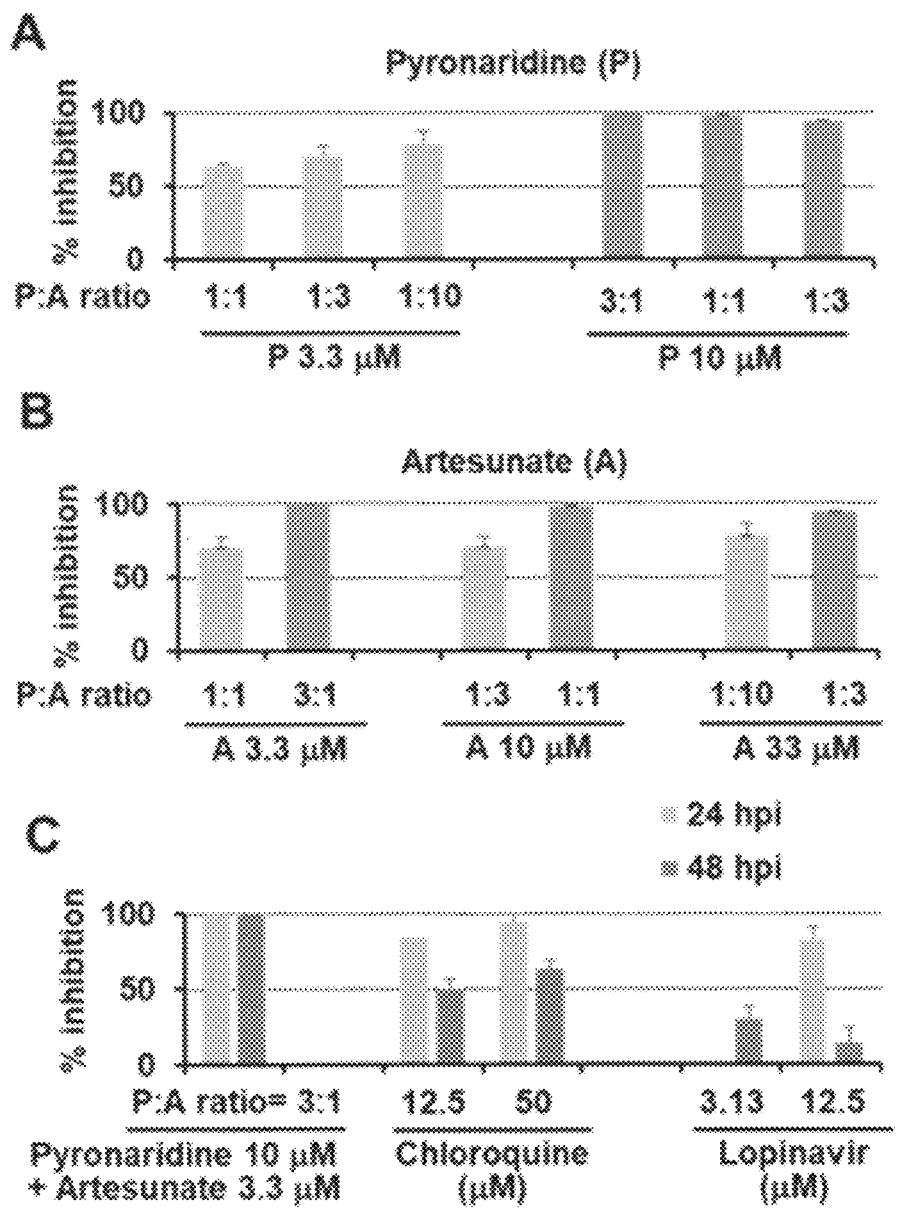
FIG. 4 shows the results comparing the inhibitory effects by the combination in various ratios of pyronaridine tetraphosphate and artesunate in SARS-CoV-2-infected cells by the combinations, and at the optimal ratio, the inhibitory effects against viruses at 24 hours and 48 hours post-infection were compared.

As a result, as shown in FIG. 4, the antiviral effect of artesunate treated in combination with pyronaridine was higher than that of artesunate treated alone, and the antiviral effect increased as the ratio of pyronaridine in the combination was higher. Specifically, when 10 µM of pyronaridine tetraphosphate and 3.3 µM of artesunate were combined (ratio 3:1), it exhibited the inhibition rate of 90-100% against virus infection, which is a higher antiviral effect than that of chloroquine or lopinavir used as the controls. In this case, the inhibition rate against infection was maintained up to 48 hours. No significant cytotoxicity was observed in all combination ratios shown in FIG. 4, and when 10 μM of pyronaridine tetraphosphate and 3.3 μM of artesunate were treated in combination, lower cytotoxicity was observed in comparison to the treatment with 10 μM of pyronaridine tetraphosphate alone (49.5% decrease).

Experimental Example 5: Inhibitory Effects of Pyronaridine Tetraphosphate or Artesunate Against SARS-CoV-2 in Human Lung Cell Lines (Co-Treatment)

Figure 5:
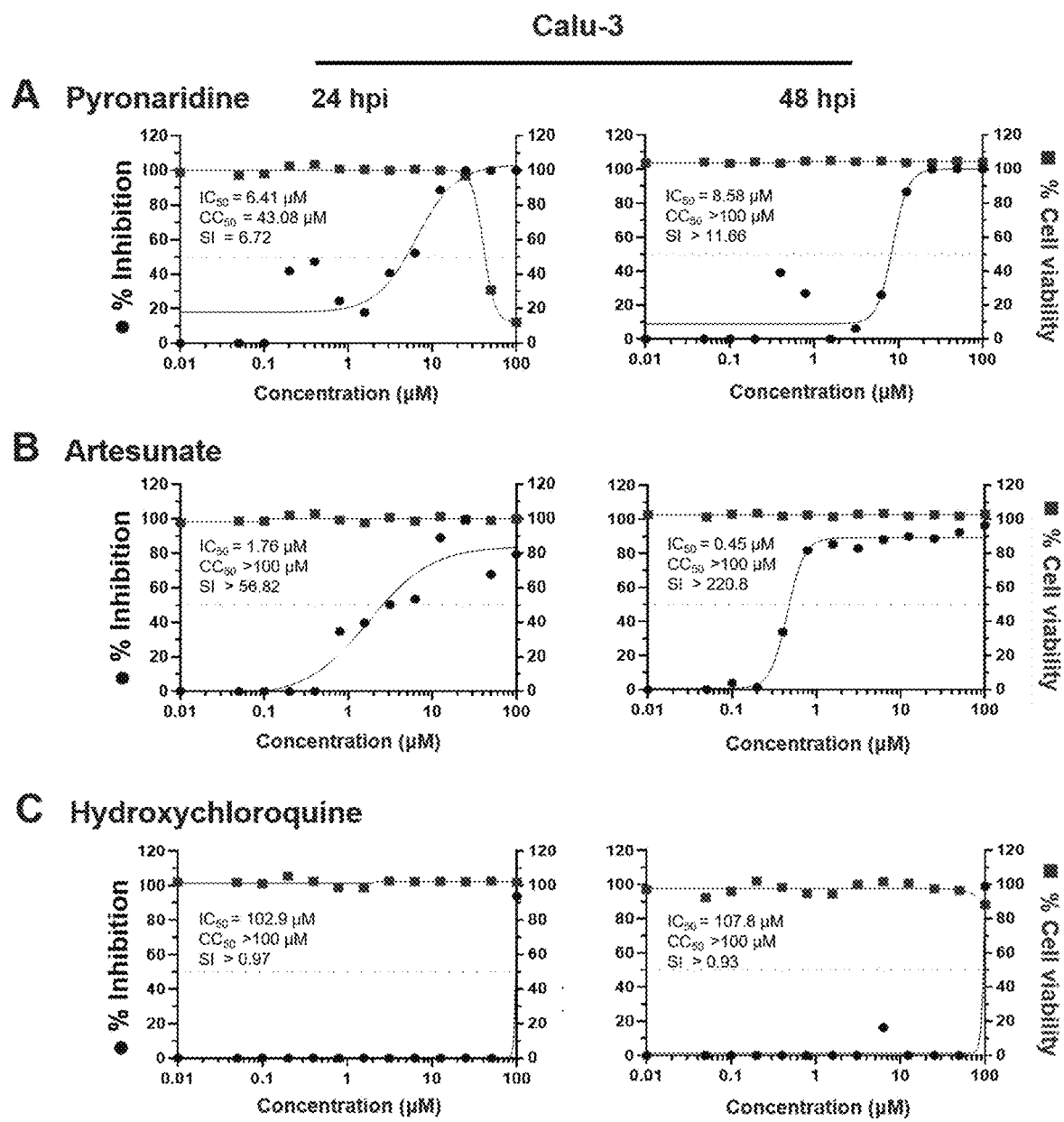
FIG. 5 is concentration-response curves regarding the inhibitory effects against SARS-CoV-2 and cytotoxicity measured 24 hours and 48 hours post-infection in the human lung cell line, Calu-3 cells, in comparison with those by hydroxychloroquine as a control, when pyronaridine tetraphosphate or artesunate was treated simultaneously with virus infection.

It has been reported that there may be species difference among the antiviral actions in humans and other animals, such as receptor structures. Therefore, in order to confirm the efficacy in human lung cell lines, in Experimental Example 5, when SARS-CoV-2 (a Korean isolate) was inoculated into Calu-3 cells (human lung cell line), pyronaridine phosphate or artesunate was treated and evaluated for efficacy in inhibiting viral infection. the inhibitory effects of pyronaridine tetraphosphate or artesunate against viral infection were evaluated in human lung cell lines, Calu-3 cells, when co-treated cells at the time of SARS-CoV-2 (a Korean isolate) infection.
1) Preparation of Viruses and Host Cells
Calu-3 cells were incubated at 37° C. with 5% $CO_2$ in Dulbecco's Modified Eagle's Medium (DMEM), supplemented with 10% heat-inactivated fetal bovine serum (FBS) and an antibiotic. SARS-CoV-2 was provided by the Korea Centers for Disease Control and Prevention (KCDC).
2) Measurement of Antiviral Efficacy Using RNA Copy Numbers
After dissolving in DMSO, pyronaridine tetraphosphate was diluted to a concentration of 0.033-100 μM using media. Twenty-four hours before the experiment, SARS-CoV-2 was inoculated into Vero cells seeded in a 96-well plate at a density of $2 \times 10^4$ cells/well (MOI=0.01), and the culture media containing various dilutions of drug were added to each well. At 24 hours and 48 hours after infection, qRT-PCR was performed against the RdRp gene as shown in Experimental Example 2. A drug concentration-response curve was drawn with the viral infection inhibition rate (% inhibition) from the virus titer inversely calculated from the RNA copy number, and 50% effective concentration ($EC_{50}$, the concentration that inhibits virus titer by 50%) was calculated using the Graph Prism (Ver. 8) analysis program, as shown in Experimental Example 1.
3) Measurement of Cytotoxicity (% Cytotoxicity)
Cytotoxicity was measured in the same manner as in Experimental Example 2.
As a result, as shown in FIG. 5, both pyronaridine and artesunate exhibited antiviral effects in human lung cell lines in a concentration-dependent manner when co-treated at the time of infections. In addition, at both 24 hours post-infection (24 hpi) and 48 hours post-infection (48 hpi), they exhibited antiviral activities against SARS-CoV-2, more than 90% inhibition, at non-cytotoxic concentrations (pyronaridine 48 hours post-infection $IC_{50}$=8.58 μM, $CC_{50}$>100 μM; selectivity index, SI>11.66; artesunate 48 hours post-infection $IC_{50}$=0.45 μM, $CC_{50}$>100 μM; selectivity index, SI>220.8). Specifically, in the case of artesunate, the effect was significantly increased in the human lung cell lines compared to that in the monkey kidney cell lines, Vero cells. Contrary to those, hydroxychloroquine showed no antiviral effect at less than 50 μM in the human lung cell lines, whereas hydroxychloroquine showed antiviral efficacy in the monkey cell lines.

Figure 6:
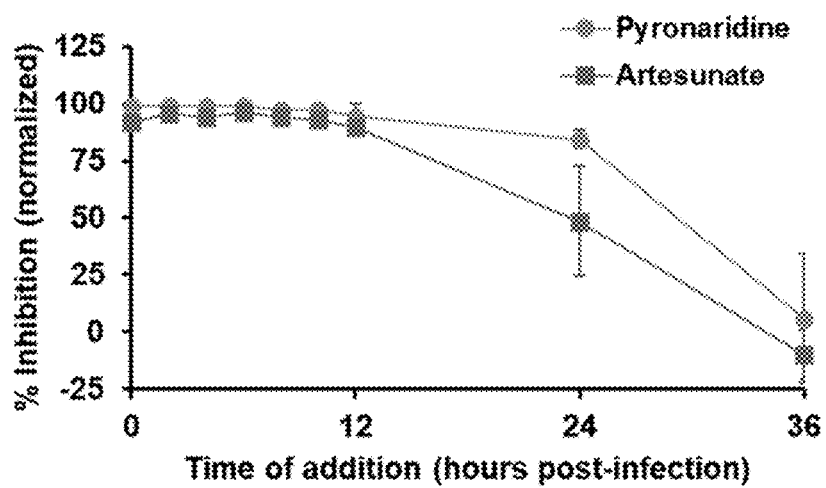
FIG. 6 is a concentration-response curve regarding the inhibitory effects against SARS-CoV-2 by post-infection treatment with pyronaridine tetraphosphate or artesunate in the human lung cell line, Calu-3 cells, when measured 48 hours after drug treatment.

Experimental Example 6: Inhibitory Effects of Post-Infection Treatment with Pyronaridine Tetraphosphate or Artesunate Against SARS-CoV-2 in Human Lung Cell Lines In Experimental Example 6, pyronaridine tetraphosphate or artesunate was treated each in Calu-3 cells at 0, 2, 4, 6, 8, 10, 12, 24 and 36 hours after SARS-CoV-2 (a Korean isolate) inoculation, and evaluated how long hours the inhibitory effect of each drug were retained against virus infections.
1) Preparation of Viruses and Host Cells
Calu-3 cells and viruses were prepared in the same manner as shown in Experimental Example 5.
2) Determination of Antiviral Efficacy Using Viral Plaque Assay
After dissolving pyronaridine tetraphosphate and artesunate in DMSO each, it was diluted to 12.5 μM using media. At 1 hour after the inoculation with SARS-CoV-2 (MOI=0.1), the supernatant was removed, and Calu-3 cells were washed, followed by the addition of DMEM culture media containing 2% bovine serum. The culture media containing drugs were added at 0, 2, 4, 6, 8, 10, 12, 24 and 36 hours each. At 48 hours after each drug treatment, cell supernatants were harvested and a plaque assay—in which the plaques generated by infectious virus infection were counted in Vero cells, cells used for virus amplification—was performed. The DMEM-F12 medium layer containing 2% agarose was laid on the layer of infected Vero cells, and the number of plaques was counted by using counter-staining with crystal violet, after incubation for 72 hours. The antiviral efficacy of the drug was analyzed with the viral infection inhibition rate (% inhibition) from the virus titer inversely calculated from the number of plaques formed and compared with the control.
As a result, as seen in FIG. 6, the maximum antiviral efficacy was shown when 12.5 μM pyronaridine was treated (>99% inhibition when added at up to 6 hours post-infection, >94% inhibition when added at up to 12 hours post-infection, and 90% inhibition when added at up to 24 hours post-infection). On the other hand, 12.5 μM artesunate treatment showed 92-96% inhibition when added at up to 6 hours post-infection, >90% inhibition when added at up to 12 hours post-infection, and 48% inhibition when added at up to 24 hours post-infection.

Experimental Example 7: Inhibitory Effects of Pyronaridine Tetraphosphate/Artesunate Combination Against SARS-CoV-2 in COVID-19 Animal Models In Experimental Example 7, pyronaridine tetraphosphate and artesunate (combination in a 3:1 ratio) were orally administered to hamsters infected with SARS-CoV-2 (a Korean isolate) to evaluate in vivo antiviral efficacy in animals.
1) Preparation of Viruses and Hamsters for SARS-CoV-2 Inoculation
SARS-CoV-2 virus was provided by the Korea Centers for Disease Control and Prevention (KCDC). As experimental animal models, Syrian hamsters—which showed high susceptibility to SARS-CoV-2 and had low restriction in supply—were used, and SARS-CoV-2 (1×10$^6$ PFU/100 μL) was inoculated to each of both nasal passages of the hamster with an amount of 50 μL.

2) In Vivo Antiviral Efficacy Measurement Using Plaque Assay

At 1 hour after nasal inoculation with SARS-CoV-2, pyronaridine tetraphosphate (180 mg/kg or 360 mg/kg) and artesunate (60 mg/kg or 120 mg/kg) were orally administered as the combination of 3:1 ratio once a day for 3 days, and in vivo antiviral efficacy of the combination of two drugs against SARS-CoV-2 was evaluated. As the comparative experimental group, pyronaridine 360 mg/kg alone was orally administered once at 25 hours after infection to evaluate the duration of post-infection efficacy of pyronaridine alone. Both pyronaridine tetraphosphate and artesunate were prepared just before use, completely dissolved in 5% sodium bicarbonate, and orally administered. As the control groups, a normal control group (Mock) in which virus was not inoculated and a vehicle control group in which only a solvent was administered at the same time were used. At 4-day post-infection, both the left and right lobes of the lungs were excised, the virus was extracted, and the virus titers in the lung tissues were analyzed by a plaque assay as described in Experimental Example 6. The viral titer in the lungs quantified by a plaque assay was normalized to the total weight (g) of the lung tissues, and then converted to log value to calculate the final titer (Log$_{10}$ plaque forming unit/g, Log$_{10}$ PFU/g).

Figure 7:
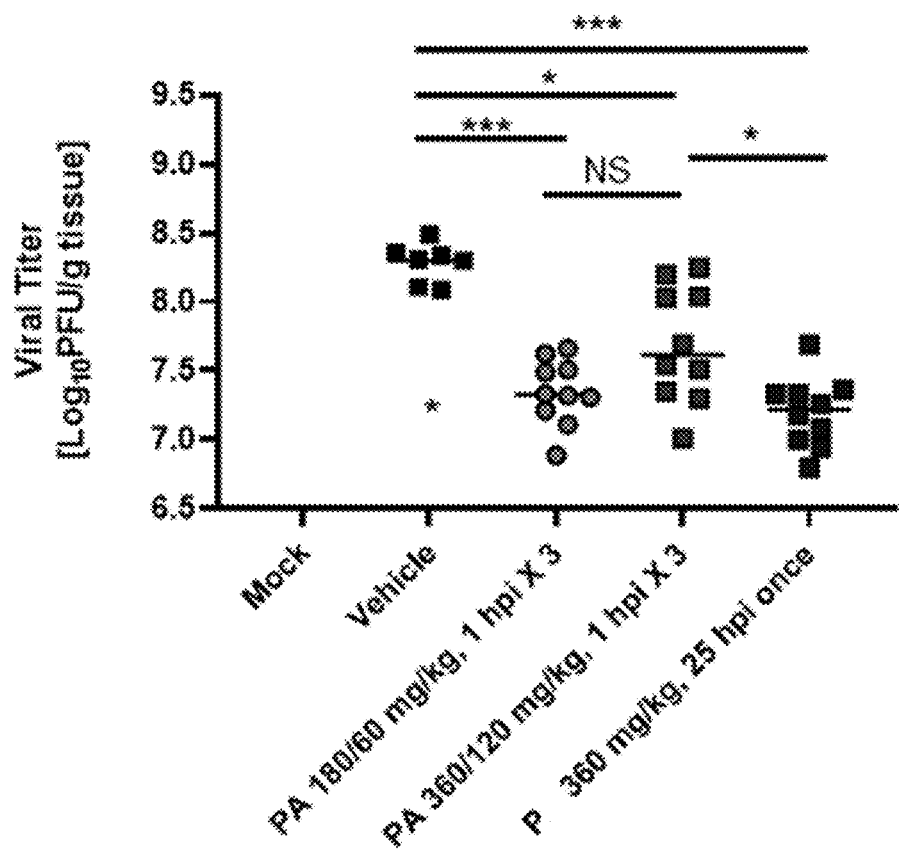
FIG. 7 shows the results in which hamsters were infected with SARS-CoV-2 and orally administered with low or high doses of pyronaridine tetraphosphate and artesunate in combination at 3:1 ratio at 1 hour post-infection once a day for 3 days, or with high dose of pyronaridine tetraphosphate alone at 25 hours post-infection, and then the viral titers in the lungs were analyzed at day 4 post-infection and compared the virus-inoculated control group in which the drugs were not administered.

As a result, as shown in FIG. 7, at 4-day post-infection, the reduction in the titer of the infectious virus in the lung tissues was statistically significant in both the pyronaridine tetraphosphate (P)-artesunate (A) 180/60 mg/kg and 360/120 mg/kg co-administration groups [median Log$_{10}$ PFU: 8.30 for virus-challenged vehicle control group vs. 7.22 for PA 180/60 mg/kg Co-administration group ($p<0.001$); vs. 7.61 for PA 360/120 mg/kg co-administration group ($p=0.046$)]. On the other hand, when pyronaridine tetraphosphate alone was orally administered, a significant decrease in the infectious virus titer was observed in the lung tissue when high dose of 360 mg/kg was administered, and a significant inhibitory effect was observed even if it was administered once at 25 hours post-infection [median Log$_{10}$ PFU 8.30 for virus-challenged vehicle control group vs. single high-dose 25 hpi administration group 7.22 ($p<0.001$)].

What is claimed is:

1. A method for treating a respiratory disease caused by a coronavirus infection comprising:
administering to a subject in need thereof a therapeutically effective amount of (i) pyronaridine or a pharmaceutically acceptable salt thereof, or (ii) artemisinin or a pharmaceutically acceptable salt thereof.

2. The method of claim 1, comprising administering to a subject in need thereof both (i) pyronaridine or a pharmaceutically acceptable salt thereof, and (ii) artemisinin or a pharmaceutically acceptable salt thereof.

3. The method of claim 1, wherein the pharmaceutically acceptable salt of pyronaridine is selected from the group consisting of phosphate, sulfate, hydrochloride, acetate, methanesulfonate, benzenesulfonate, toluenesulfonate, maleate and fumarate.

4. The method of claim 2, wherein a weight ratio of the pyronaridine or a pharmaceutically acceptable salt thereof to the artemisinin or a derivative thereof is 10:1 to 1:10.

5. The method of claim 3, wherein the weight ratio of the pyronaridine or a pharmaceutically acceptable salt thereof to the artemisinin or a derivative thereof is 1:1 to 6:1.

6. The method of claim 5, wherein the weight ratio of the pyronaridine or a pharmaceutically acceptable salt thereof to the artemisinin or a derivative thereof is 3:1.

7. The method of claim 1, wherein the artemisinin derivative is selected from the group consisting of dihydroartemisinin, artesunate, artemether and arteether.

8. The method of claim 7, wherein the artemisinin derivative is artesunate.

9. The method of claim 1, which at least one other antiviral agent is further administered.

10. The method of claim 2, which at least one other antiviral agent is further administered.

11. The method of claim 9, wherein the other antiviral agent is selected from the group consisting of a viral replication inhibitor, a helicase inhibitor, a viral protease inhibitor and a viral cell entry inhibitor.

12. The method of claim 11, wherein the other antiviral agent is selected from the group consisting of ribavirin, interferon, niclosamide and a combination thereof.

13. The method of claim 1, wherein the respiratory disease caused by coronavirus infection is selected from the group consisting of Severe Acute Respiratory Syndrome (SARS), Middle East Respiratory Syndrome (MERS) and Coronavirus Disease 2019 (COVID-19).

14. The method of claim 13, wherein the respiratory disease caused by coronavirus infection is Coronavirus Disease 2019 (COVID-19).

15. The method of claim 3, wherein the pharmaceutically acceptable salt of pyronaridine is pyronaridine tetraphosphate.

* * * * *